(12) United States Patent
Paulik et al.

(10) Patent No.: US 9,338,199 B2
(45) Date of Patent: May 10, 2016

(54) SYSTEM AND METHOD FOR DETERMINATION OF AN INTERACTION MAP

(71) Applicant: CISCO TECHNOLOGY, INC., San Jose, CA (US)

(72) Inventors: Matthias Paulik, San Jose, CA (US); Vivek Halder, Cupertino, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 318 days.

(21) Appl. No.: 13/936,690

(22) Filed: Jul. 8, 2013

(65) Prior Publication Data

US 2015/0012844 A1 Jan. 8, 2015

(51) Int. Cl.
*G06K 9/46* (2006.01)
*H04L 29/06* (2006.01)

(52) U.S. Cl.
CPC .......... *H04L 65/403* (2013.01); *H04L 65/1096* (2013.01)

(58) Field of Classification Search
CPC .................................................... H04L 65/403
USPC ........................................................ 715/753
See application file for complete search history.

(56) References Cited

U.S. PATENT DOCUMENTS

| 2009/0309956 | A1* | 12/2009 | Hawkins | H04M 3/56 348/14.08 |
| 2010/0250252 | A1* | 9/2010 | Yasoshima | H04L 12/1827 704/246 |
| 2011/0014972 | A1 | 1/2011 | Herrmann et al. | |
| 2011/0295392 | A1* | 12/2011 | Cunnington | G06Q 10/10 700/90 |
| 2012/0023455 | A1* | 1/2012 | Chen et al. | 715/853 |

OTHER PUBLICATIONS

Enhanced VQ-based Algorithms for Speech Independent Speaker Identification. Ningping Fan and Justinian Rosco. 2003.*
Laskowski, Kornel, et al., "Modeling Vocal Interaction for Text-Independent Participant Characterization in Multi-Party Conversation," Proceedings of the 9$^{th}$ SIGdial Workshop on Discourse and Dialogue, Jun. 2008, pp. 148-155.

\* cited by examiner

*Primary Examiner* — Stephen R Koziol
*Assistant Examiner* — Delomia L Gilliard
(74) *Attorney, Agent, or Firm* — Patent Capital Group

(57) ABSTRACT

An example method is provided and includes receiving recorded meeting information, selecting a meeting participant from the recorded meeting information, determining at least one of meeting participant emotion information, meeting participant speaker role information, or meeting participant engagement information based, at least in part, on the meeting information, and determining an interaction map associated with the meeting participant based, at least in part, on at least one of the meeting participant emotion information, the meeting participant speaker role information, or the meeting participant engagement information.

25 Claims, 8 Drawing Sheets

US 9,338,199 B2

SYSTEM AND METHOD FOR DETERMINATION OF AN INTERACTION MAP

TECHNICAL FIELD

This disclosure relates in general to the field of communications and, more particularly, to determination of an interaction map.

BACKGROUND

In certain architectures, service providers and/or enterprises may seek to offer sophisticated online conferencing services for their end users. The conferencing architecture may offer an "in-person" meeting experience over a network. Conferencing architectures may also deliver real-time interactions between people using advanced visual, audio, and multimedia technologies. Virtual meetings and conferences have an appeal because they may be held without the associated travel inconveniences and costs. In addition, virtual meetings may provide a sense of community to participants who are dispersed geographically. There are new interactive paradigms that have emerged that differ from face-to-face interactions.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

One or more embodiments may provide an apparatus, a method, a computer readable medium, a non-transitory computer readable medium, a computer program product, and/or the like, to perform receiving recorded meeting information, selecting a meeting participant (e.g., their user ID, user name, symbol, tag, avatar, etc.) from the recorded meeting information, determining at least one of meeting participant emotion information, meeting participant speaker role information, or meeting participant engagement information based, at least in part, on the meeting information, and determining an interaction map associated with the meeting participant based, at least in part, on at least one of the meeting participant emotion information, the meeting participant speaker role information, or the meeting participant engagement information

Example Embodiments

Figure 1:
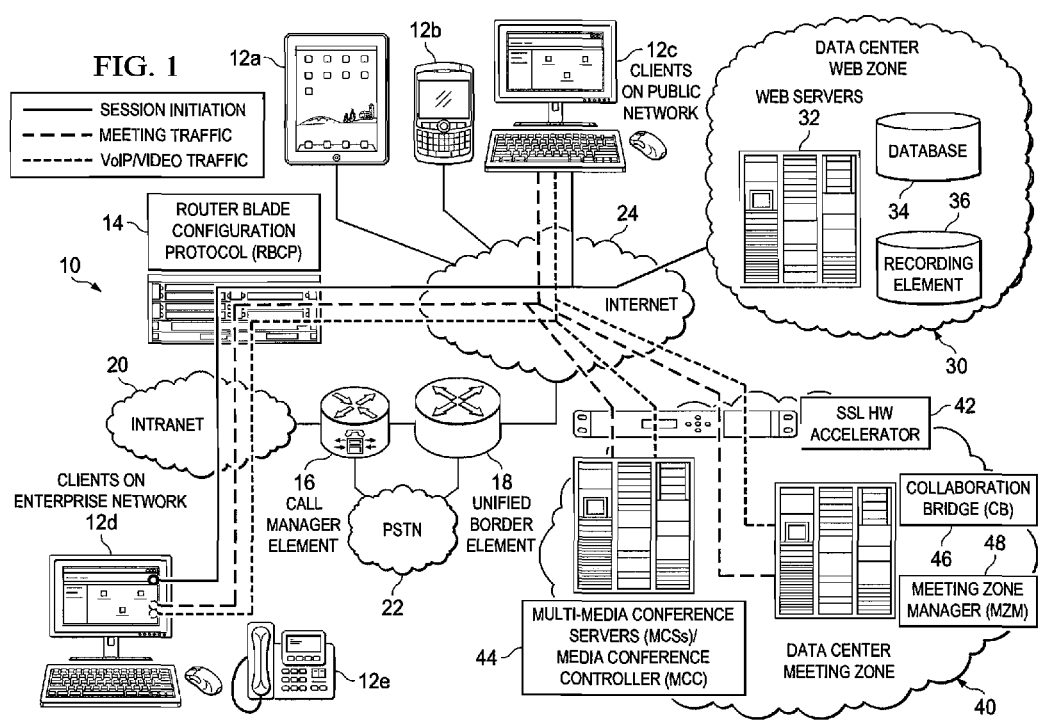
FIG. 1 is a simplified schematic diagram of a communication system for managing a conversation in accordance with at least one example embodiment.

FIG. 1 is a simplified schematic diagram of a communication system 10 for managing a conversation in accordance with at least one example embodiment. Communication system 10 may include a number of endpoints 12*a-e* that may achieve suitable network connectivity via various points of attachment. In the example of FIG. 1, communication system 10 includes an Intranet 20, a public switched telephone network (PSTN) 22, and an Internet 24, which (in this particular example) offers a pathway to a data center web zone 30 and a data center meeting zone 40.

Data center web zone 30 includes a plurality of web servers 32, a database 34, and a recording element 36. Data center meeting zone 40 includes a secure sockets layer hardware (SSL HW) accelerator 42, a plurality of multimedia conference servers (MCSs)/media conference controller (MCC) 44, a collaboration bridge 46, and a meeting zone manager 48. In at least one example embodiment, each MCS may be configured to coordinate video and voice traffic for a given online meeting. Additionally, each MCC may be configured to manage the MCS from data center meeting zone 40.

Various types of routers and switches may be used to facilitate communications amongst any of the elements of FIG. 1. For example, a call manager element 16 and a unified border element 18 may be provisioned between PSTN 22 and Intranet 20. Also depicted in FIG. 1 are a number of pathways (e.g., shown as solid or broken lines) between the elements for propagating meeting traffic, session initiation, and voice over Internet protocol (VoIP)/video traffic.

Figure 2:
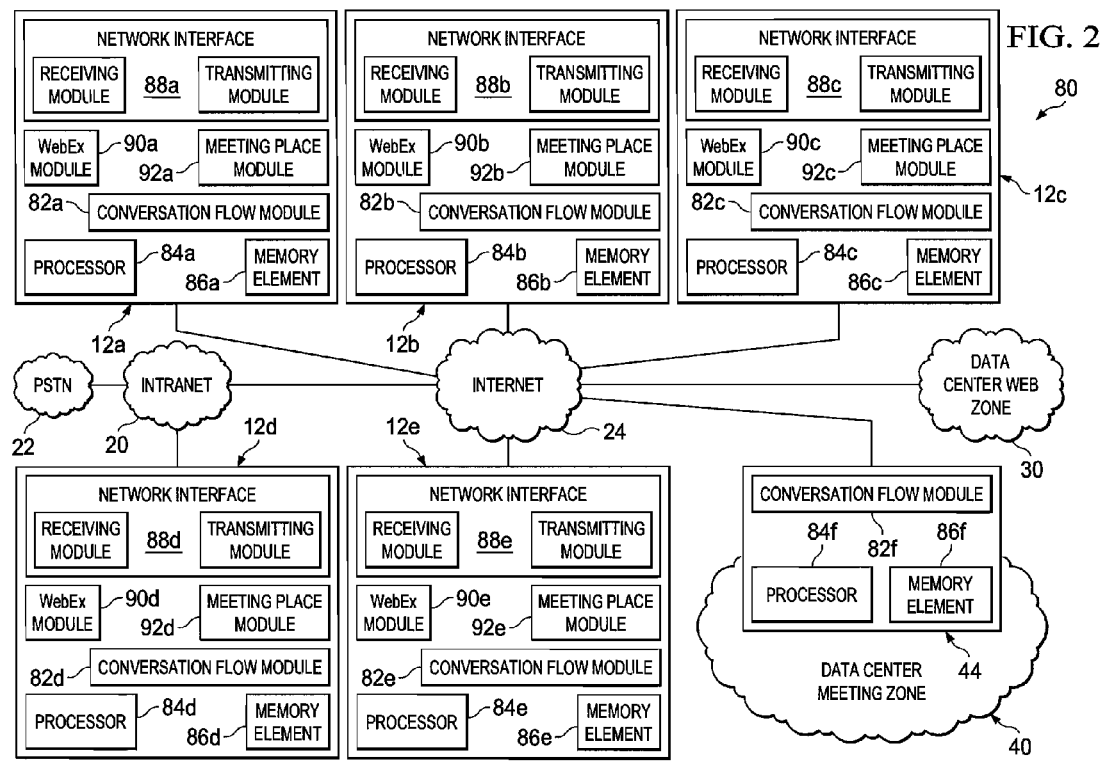
FIG. 2 is a simplified schematic diagram illustrating possible details related to an example infrastructure of a communication system in accordance with at least one example embodiment.

FIG. 2 is a simplified schematic diagram illustrating possible details related to an example infrastructure of a communication system 10 in accordance with at least one example embodiment. Each of endpoints 12*a-e* are provisioned with a respective conversation flow module 82*a-e*, a respective processor 84*a-e*, a respective memory element 86*a-e*, a respective WebEx module 90*a-e*, a respective Meeting Place module 92*a-e*, and a respective network interface 88*a-e*, which includes a respective receiving module and a respective transmitting module for exchanging data (e.g., for exchanging packets in a network environment). FIG. 2 illustrates an example implementation of MCSs/MCC 44 that is similarly provisioned with a conversation flow module 82*f*, a processor 84*f*, and a memory element 86*f*.

In at least one example embodiment, each endpoint 12*a-e* and/or MCSs/MCC 44 includes software (e.g., as part of conversation flow modules 82*a-f*) to achieve or to support managing a conversation, as outlined herein in this document.

In other embodiments, this feature may be provided externally to any of the aforementioned elements, or included in some other network element to achieve this functionality. Alternatively, several elements may include software (or reciprocating software) that may coordinate in order to achieve the operations, as outlined herein. In still other embodiments, any of the devices of the FIGURES may include any suitable algorithms, hardware, software, components, modules, interfaces, or objects that facilitate in managing a conversation.

It is imperative to note that FIG. 2 is indicative of just one, of the multitude, of example implementations of communication system 10. Any of the modules or elements within endpoints 12a-e and/or MCSs/MCC 44 may readily be replaced, substituted, or eliminated based on particular needs. Furthermore, although described with reference to particular scenarios, where a given module (e.g., WebEx module 90a-e, Meeting Place module 92a-e, conversation flow module 82a-e, etc.) is provided within endpoints 12a-e or MCSs/MCC 44, any one or more of these elements may be provided externally, or consolidated and/or combined in any suitable fashion. In certain instances, certain elements may be provided in a single proprietary module, device, unit, etc. in order to achieve the teachings of the present disclosure.

Endpoints 12a-e are representative of any type of client or user wishing to participate in a meeting session in communication system 10 (e.g., or in any other online platform). Furthermore, endpoints 12a-e may be associated with individuals, clients, customers, or end users wishing to participate in a meeting session in communication system 10 via some network. The term 'endpoint' is inclusive of devices used to initiate a communication, such as a computer, a personal digital assistant (PDA), a laptop or electronic notebook, a cellular telephone of any kind, an iPhone, an IP phone, a Blackberry, a Google Droid, an iPad, a tablet, or any other device, component, element, or object capable of initiating voice, audio, video, media, or data exchanges within communication system 10. Endpoints 12a-e may also be inclusive of a suitable interface to the human user, such as a microphone, a display, or a keyboard or other terminal equipment. Endpoints 12a-e may also be any device that seeks to initiate a communication on behalf of another entity or element, such as a program, a proprietary conferencing device, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another.

MCSs/MCC 44 and web servers 32 are network elements that manage (or that cooperate with each other in order to manage) aspects of a meeting session. As used herein in this Specification, the term 'network element' is meant to encompass any type of servers (e.g., a video server, a web server, etc.), routers, switches, gateways, bridges, loadbalancers, firewalls, inline service nodes, proxies, network appliances, processors, modules, or any other suitable device, component, element, or object operable to exchange information in a network environment. This network element may include any suitable hardware, software, components, modules, interfaces, or objects that facilitate the operations thereof. This may be inclusive of appropriate algorithms and communication protocols that allow for the effective exchange (reception and/or transmission) of data or information. In one particular example, MCSs/MCC 44 and web servers 32 are servers that may interact with each other via the networks of FIG. 1.

Intranet 20, PSTN 22, and Internet 24 represent a series of points or nodes of interconnected communication paths for receiving and transmitting packets of information that propagate through communication system 10. These networks may offer connectivity to any of the devices or endpoints of FIG. 1. Moreover, Intranet 20, PSTN 22, and Internet 24 offer a communicative interface between sites (and/or participants, rooms, etc.) and may be any local area network (LAN), wireless LAN (WLAN), metropolitan area network (MAN), wide area network (WAN), extranet, Intranet, virtual private network (VPN), virtual LAN (VLAN), or any other appropriate architecture or system that facilitates communications in a network environment.

Intranet 20, PSTN 22, and Internet 24 may support a transmission control protocol (TCP)/IP, or a user datagram protocol (UDP)/IP in particular embodiments of the present disclosure; however, Intranet 20, PSTN 22, and Internet 24 may alternatively implement any other suitable communication protocol for transmitting and receiving data packets within communication system 10. Note also that Intranet 20, PSTN 22, and Internet 24 may accommodate any number of ancillary activities, which may accompany a meeting session. This network connectivity may facilitate all informational exchanges (e.g., notes, virtual whiteboards, PowerPoint presentations, e-mailing, word-processing applications, etc.). Along similar reasoning, Intranet 20, PSTN 22, and Internet 24 may foster all such communications and, further, be replaced by any suitable network components for facilitating the propagation of data between participants in a conferencing session.

It should also be noted that endpoints 12a-e and MCSs/MCC 44 may share (or coordinate) certain processing operations. Using a similar rationale, their respective memory elements may store, maintain, and/or update data in any number of possible manners. Additionally, any of the illustrated memory elements or processors may be removed, or otherwise consolidated such that a single processor and a single memory location is responsible for certain activities associated with managing a conversation. In a general sense, the arrangement depicted in FIG. 2 may be more logical in its representations, whereas a physical architecture may include various permutations/combinations/hybrids of these elements.

Figure 7:
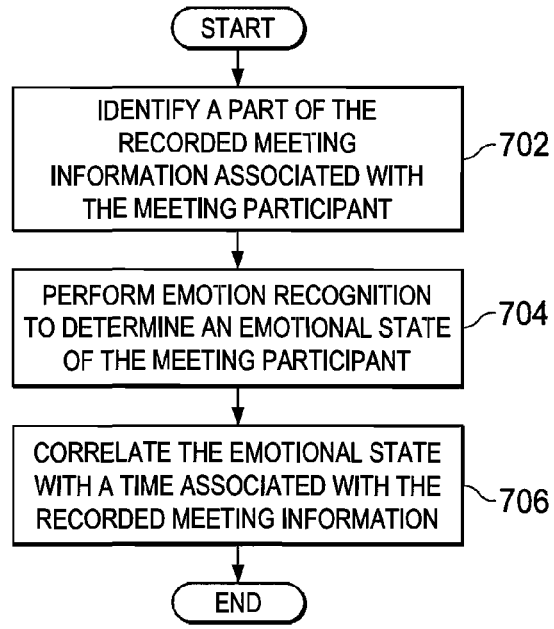
FIG. 7 is a flow diagram illustrating activities associated with determination of meeting participant emotion information according to at least one example embodiment.

Note that in certain example embodiments, the conversation management functions outlined herein may be implemented by logic encoded in one or more tangible media (e.g., embedded logic provided in an application specific integrated circuit (ASIC), digital signal processor (DSP) instructions, software (potentially inclusive of object code and source code) to be executed by a processor, or other similar machine, etc.). In some of these instances, a memory element (as shown in FIG. 7) may store data used for the operations described herein. This includes the memory element being able to store software, logic, code, or processor instructions that may be executed to carry out the activities described in this Specification. A processor may execute any type of instructions associated with the data to achieve the operations detailed herein in this Specification. In one example, the processor (as shown in FIG. 7) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

In one example implementation, conversation flow modules 82a-f include software in order to achieve the conversation management functions outlined herein. These activities may be facilitated by MCSs/MCC 44 and/or the various endpoints 12a-f. MCSs/MCC 44 and/or endpoints 12a-f may include memory elements for storing information to be used in managing a conversation, as outlined herein. Additionally, MCSs/MCC 44 and/or endpoints 12a-f may include a processor that may execute software or an algorithm to perform management of a conversation, as discussed in this Specification. These devices may further keep information in any suitable memory element (random access memory (RAM), ROM, EPROM, EEPROM, ASIC, etc.), software, hardware, or in any other suitable component, device, element, or object where appropriate and based on particular needs. Any possible memory items (e.g., database, table, cache, etc.) should be construed as being encompassed within the broad term 'memory element.' Similarly, any of the potential processing elements, modules, and machines described in this Specification should be construed as being encompassed within the broad term 'processor.'

Figure 3:
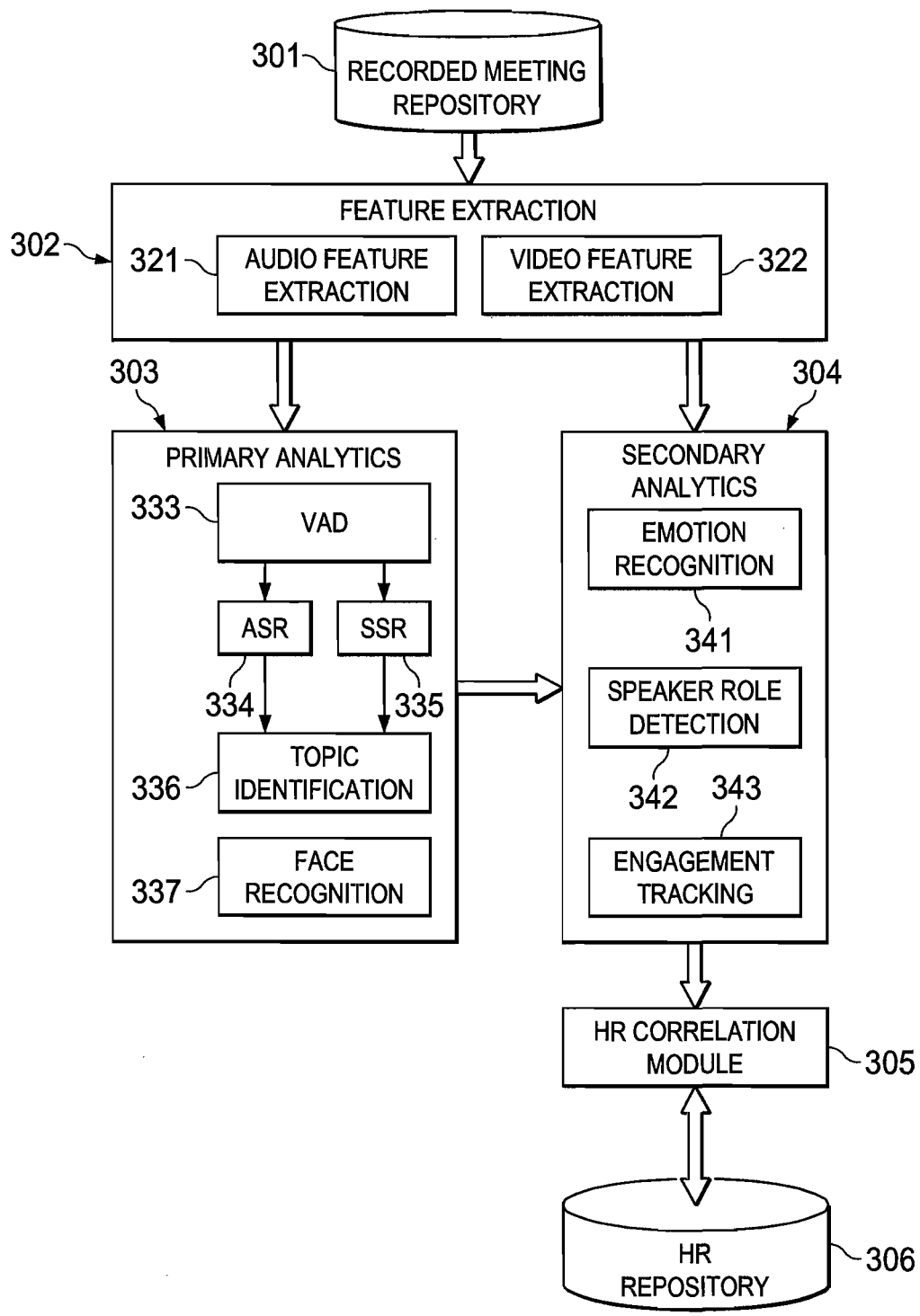
FIG. 3 is an illustration relating to components associated with an interaction map according to at least one example embodiment.

FIG. 3 is an illustration relating to components associated with an interaction map according to at least one example embodiment. The example of FIG. 3 is merely an example and does not limit the claims in any way. For example, number of components may vary, operations attributable to a component may vary, interrelationship among components may vary, and/or the like.

Corporate human resource (HR) departments and executive management teams face dramatic challenges in workforce assessment and management. For example, human resource departments struggle to maximize employee performance, minimize employee turnover, assist employees in developing career plans, etc. Many HR departments try to optimize the achievement of these objectives by developing a comprehensive insight into the corporate workforce. For example, the HR department may seek to discover, measure, and evaluate employee strengths, employee weaknesses, employee characteristics, and/or the like. Furthermore, HR departments may often be interested in similar analysis regarding meetings, teams, business units, and/or even the company as a whole. Moreover, many HR departments seek to gain foresight into the behaviors of such entities through similar methods. For example, the HR department may seek to predict such employment events as an increase in employee turnover with regards to any level in the organization. In many circumstances, adequate understanding of such issues may play a key role in the HR department meeting such challenges.

In some circumstances, HR departments may utilize tools, such as software tools, manual surveys, etc., that allow collecting, accessing, and analyzing workforce information. However, such workforce information is often times collected as a separate effort, isolated from the actual work and interaction of the employees. For example, supervisors may manually enter workforce information into HR department records after employee discussions. In another example, employees themselves may provide information by providing career goals, self-assessment, completing surveys, etc.

Although such information may often be useful, in many circumstances, it may be desirable to obtain employee information based on the true actions of the employees in the performance of their work. For example, although self-assessment and supervisor assessment may be useful, it may also be useful to assess the manner in which employees interact with each other, the manner in which employees behave, that level of attention that employees direct toward their work, etc. It may be desirable to obtain such information based on the actions of the employees as they are performing their jobs. However, in many circumstances, gather such information throughout the workday may be undesirably expensive and/or invasive. Therefore, it may be desirable to mine such information from information that may be obtained for other purposes.

As previously stated, many companies utilize network-based meeting sessions to conduct meetings within the organization. In many circumstances, the meeting sessions may be recorded. For example, meeting session information, such as meeting attendee information, audio information video information, shared data information, messaging information, and/or the like, may be stored to a recorded meeting repository. It may be desirable to reduce time, cost effort, etc. associated with gathering and analyzing information regarding employee behaviors and perceptions. In at least one example embodiment, an apparatus utilizes recorded meeting information to automatically generate information that describes employee interactions with each other regarding one or more recorded meeting sessions. Without limiting the scope of the claims in any way, at least one technical advantage associated with automatically generating interaction information based, at least in part, on the recorded meeting information may be to save time in acquisition of the information by the HR department, avoid utilization of employee time for information acquisition, acquiring information from actual work experiences instead of hypothetical scenarios, and/or the like.

In some circumstances, a company may often record many of its meeting sessions. In such circumstances, the corporation may utilize indexing solutions that utilize audio and video analytics to generate a meeting index for a meeting session. For example, speech recognition, face recognition, audio-based speaker segmentation, and speaker recognition may provide information regarding who spoke when and what was spoken. Video and audio analytics may also capable of automatically providing information regarding meeting participant emotion, role engagement, and/or the like.

In some circumstances, it may be desirable to leverage such information for the purpose of workforce analytics. For example, emotion recognition may assist in identification of early warning signals for negative employee sentiment, may assist in detection of tensions within teams, may assist in detection of tensions between employees and supervisors, and/or the like. Further, audio-based speaker role/characterization, which may effectively identify authority level in meeting scenarios, can be helpful to indicate employee promotability or suitability for a particular task (collaborative vs. self-driven, consensus builder vs. decision maker). Similarly, lack of engagement of individual employees in meeting discussions may indicate opportunities for employee development.

In at least one example embodiment, it may be desirable to supplement a meeting indexing system with components that are configured to determine employee interaction information based, at least in part, on the meeting session information.

In the example of FIG. 3, feature extraction module 302 may retrieve recorded meeting session information from recorded meeting repository 301. The recorded meeting repository may relate to one or more components that provide for storage of meeting session information acquired during a meeting session, after a meeting session, and/or the like.

Feature extraction module 302 may provide feature extraction information to one or more other modules. Feature extraction module 302 may utilize audio feature extraction module 321, video feature extraction module 322, and/or the like, to generate the feature extraction information. For example, feature extraction module 302 may utilize audio feature extraction module 321 to generate mel-frequency cepstrum (MFC) information, such as one or more mel-frequency cepstral coefficients (MFCC). In such an example, the feature extraction information may comprise the MFC information. In another example, feature extraction module 302 may utilize video feature extraction module 322 to generate scale-invariant feature transform (SIFT) information. In such an example, the feature extraction information may comprise the SIFT information.

Primary analytics module may utilize feature extraction information from feature extraction module 302, and may provide primary analytics information. In at least one example embodiment, an apparatus may utilize primary analytics module 303 for indexing meeting session information. In at least one example embodiment, the primary analytics information comprises information indicative of meeting participant identity, identity of a speaker, identification of words that were spoken, indication of a topic that was discussed, and/or the like. In at least one example embodiment, the primary analytics module comprises a voice activity determination (VAD) module 333. In at least one example embodiment, VAD module may identify one or more portions of feature extraction information that is associated with speech. In at least one example embodiment, primary analytics module 303 may comprise an automatic speech recognition (ASR) module 334, speaker segmentation and recognition (SSR) module 335, and/or the like. ASR module 334 and/or SSR module 335 may identify spoken words, phrases, etc., based, at least in part on the feature extraction information. For example, SSR module 335 may automatically segment audio information into segments based, at least in part, on an identified speaker. SSR module 335 may label the segments based on an identity of the speaker. In this manner, the segments may relate to speaker segments. In at least one example embodiment, SSR module 335 utilizes a voice print to identify a speaker. For example, if there is a one hour meeting where a first speaker speaks from the start of the meeting to 55 minutes into the meeting, a second speaker speaks from 55 minutes into the meeting to 57 minutes into the meeting, and the first speaker speaks from 57 minutes into the meeting to the end of the meeting, the SSR module may identify the first and second speaker based on voice prints of the first speaker and the second speaker.

In some circumstances, ASR module and/or SSR module may utilize voice activity information from VAD module 333 when identifying speech. In this manner, the primary analytics information may comprise information indicative of the speech identified by ASR module 334, by SSR module 335, and/or the like. In at least one example embodiment, primary analytics module 303 comprises topic identification module 336. Topic identification module 336 may identify one or more topics of one or more portions of the meeting session information based, at least in part, on identified speech, for example from ASR module 334, from SSR module 335, and/or the like. In this manner, the primary analytics information may comprise information indicative of a topic identified by topic identification module 336. In at least one example embodiment, primary analytics module 303 comprises face recognition module 337. Face recognition module 337 may identify a meeting participant in the video information of the feature extraction information. For example, face recognition 337 may identify a face in the video information and may identify a specific meeting participant to whom the face belongs. In this manner, the primary analytics information may comprise information indicative of the face recognition information provided by face recognition module 337. For example, face recognition module 337 may automatically segment video information into segments based, at least in part, on an identified meeting participant. Face recognition module 337 may label the segments based on an identity of the meeting participant. In this manner, the segments may relate to meeting participant segments. In at least one example embodiment, SSR module 335 utilizes a voice print to identify a speaker. For example, if there is a one hour meeting where a first speaker speaks from the start of the meeting to 55 minutes into the meeting, a second speaker speaks from 55 minutes into the meeting to 57 minutes into the meeting, and the first speaker speaks from 57 minutes into the meeting to the end of the meeting, the SSR module may identify the first and second speaker based on voice prints of the first speaker and the second speaker. However, if there is a non-speaking meeting participant, the apparatus may avoid usage of SSR module 335 for, at least, the reason that there is a lack of speech information associated with the non-speaking meeting participant. However, the apparatus may utilize face recognition module 337 to identify the non-speaking meeting participant, and identify video segments associated with the non-speaking meeting participant.

Secondary analytics module 304 may utilize feature extraction information from feature extraction module 302 and primary analytic information from primary analytics module 303. In at least one example embodiment, the secondary analytics module determines one or more interaction maps that are based, at least in part, on recorded meeting information. In at least one example embodiment, recorded meeting information relates to information that indicates content of a recorded meeting. For example the recorded meeting information may relate to recorded meeting information received from recorded meeting repository 301, may relate to feature extraction information that was based, at least in part, on the meeting information received from recorded meeting repository 301, may relate to primary analytics information that was based, at least in part, on feature extraction information that was based, at least in part, on the meeting information received from recorded meeting repository 301, and/or the like.

In at least one example embodiment, an interaction map relates to information that correlates various aspects of interaction among employees. There may be varying levels of scope associated with an interaction map. For example, there may be a meeting participant interaction map, a meeting interaction map, an employee interaction map, an organizational interaction map, and/or the like. For example, a meeting participant interaction map may relate to the interactions of a particular meeting participant during a meeting. In another example, a meeting interaction map may relate to interactions of a plurality of meeting participants during a meeting. In such an example, the plurality of meeting participants may relate to a subset of meeting participants, all of the meeting participants, and/or the like. In still another example, an employee interaction map may relate to an interaction map that represents meeting participant interaction maps for the same employee across a plurality of meeting sessions. In yet another example, an organizational interaction map may relate to an interaction map that represents a plurality of meeting participant interaction maps across a plurality of meeting sessions. In at least one example embodiment, there may be varying levels of scope associated with an organizational interaction map based, at least in part, on the interrelationship between the plurality of meeting participants represented in the organizational interaction map. For example, a team interaction map may relate to meeting participants that are part of the same team, a business unit interaction map may relate to meeting participants that are part of the same business unit, a company interaction map may relate to meeting participants that are part of the same company, and/or the like.

In at least one example embodiment, secondary analytics module 304 comprises emotion recognition module 341. Emotion recognition module 341 may utilize meeting information, such as feature extraction information indicative of the meeting information, primary analytics information indicative of the meeting information, and/or the like to determine emotion information. In at least one example embodiment, the emotion information may be associated with a particular meeting participant. In this manner, such emotion information may be referred to as meeting participant emotion information. In at least one example embodiment, the meeting participant emotion information relates to information indicative of an emotional state of the meeting participant in relation to, at least part of, the recorded meeting information. For example, the emotional state of the meeting participant may be agitated, angry, upset, excited, and/or the like. In at least one example embodiment, an apparatus determines the meeting participant emotion information based, at least in part, on the meeting information. The determination and the emotion information may be similar as described regarding FIG. 7.

In at least one example embodiment, secondary analytics module 304 correlates the emotion information to a time associated with the recorded meeting information. In this manner, the correlation of the emotion information to a time may allow an apparatus to draw an inference between the emotion information associated with a time and other information associated with the same time.

In at least one example embodiment, secondary analytics module 304 comprises speaker role detection module 342. Speaker role detection module 342 may utilize meeting information, such as feature extraction information indicative of the meeting information, primary analytics information indicative of the meeting information, and/or the like to determine speaker role information. In at least one example embodiment, the speaker role information may be associated with a particular meeting participant. In this manner, such speaker role information may be referred to as meeting participant speaker role information. In at least one example embodiment, the meeting participant speaker role information relates to information indicative of a classification of a role that a meeting participant may be portraying by way of his speech. For example, the meeting participant may be performing consistent with a leader role, a follower role, a facilitator role, a questioner role, and/or the like. In at least one example embodiment, an apparatus determines the meeting participant speaker role information based, at least in part, on the meeting information. The determination and the speaker role information may be similar as described regarding FIG. 8.

In at least one example embodiment, secondary analytics module 304 correlates the speaker role information to a time associated with the recorded meeting information. In this manner, the correlation of the speaker role information to a time may allow an apparatus to draw an inference between the emotion information associated with a time and other information associated with the same time.

In at least one example embodiment, secondary analytics module 304 comprises engagement tracking module 343. Engagement tracking module 343 may utilize meeting information, such as feature extraction information indicative of the meeting information, primary analytics information indicative of the meeting information, and/or the like to determine engagement information. In at least one example embodiment, the engagement information may be associated with a particular meeting participant. In this manner, such speaker role information may be referred to as meeting participant engagement information. In at least one example embodiment, the meeting participant engagement information relates to information indicative of a level of engagement of the meeting participant or a recipient of engagement from the meeting participant. For example, the meeting participant engagement information may indicate that the meeting participant may be highly engaged in the meeting, may be distracted from the meeting, and/or the like. In another example, the meeting participant engagement information may indicate the meeting participant is speaking to one or more other meeting participants. In at least one example embodiment, an apparatus determines the meeting participant engagement information based, at least in part, on the meeting information. The determination and the engagement information may be similar as described regarding FIG. 9.

In at least one example embodiment, secondary analytics module 304 correlates the engagement information to a time associated with the recorded meeting information. In this manner, the correlation of the engagement information to a time may allow an apparatus to draw an inference between the engagement information associated with a time and other information associated with the same time.

In at least one example embodiment, the apparatus determines an interaction map associated with the meeting participant based, at least in part, on the meeting participant emotion information, the meeting participant speaker role information, and/or the meeting participant engagement information. In at least one example embodiment, the interaction map may be based, at least in part, on correlation among the meeting participant emotion information, the meeting participant speaker role information, the meeting participant engagement information, and/or any other information. In at least one example embodiment, the interaction map associated with the meeting participant comprises interaction information in relation to a topic, interaction information in relation to another meeting participant, interaction quality information, and/or the like. Interaction information may be similar as described regarding FIG. 5. Interaction information in relation to another meeting participant may be similar as described regarding FIG. 6. In at least one example embodiment, interaction quality information relates to an assessment of at least one of the meeting participant emotion information, the meeting participant speaker role information, and the meeting participant engagement information in relation to an interaction quality criteria.

For example, the information map may comprise information indicated of a meeting participant becoming agitated when taking on a leadership role while conversing with another meeting participant. In another example, the information map may comprise information indicative of a meeting participant disengaging from a meeting after another meeting participant takes on a leadership role.

Figure 10:
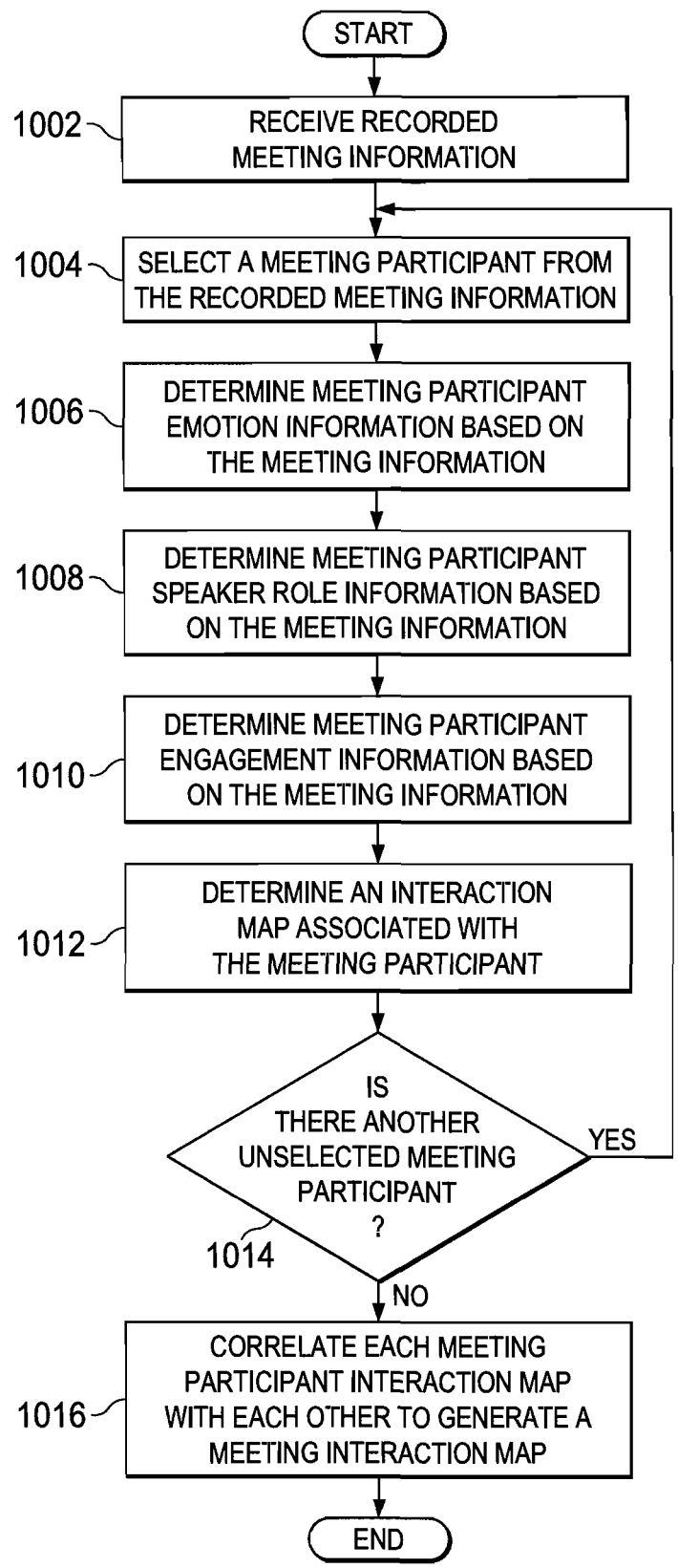
FIG. 10 is a flow diagram illustrating activities associated with a meeting interaction map according to at least one example embodiment.

In at least one example embodiment, secondary analytics module 304 may correlate each meeting participant interaction map with each other meeting participant interaction map to generate a meeting interaction map, similarly as described regarding FIG. 10. In at least one example embodiment, the meeting interaction map is indicative of interaction amongst the meeting participants of the meeting as a whole.

Human resources correlation (HR correlation) module 305 may utilize one or more interaction maps from secondary analytics module 304 and human resources information (HR information) from human resources repository (HR repository) 306. For example, HR correlation module may merge a meeting interaction map and/or an interaction map associated with a meeting participant, into an organizational interaction map. In at least one example embodiment, an organizational interaction map relates to an interaction map that comprises information indicative of a plurality of meeting interaction maps. In at least one example embodiment, HR correlation module 305 stores at least one interaction map in HR repository 306.

In some circumstances, the organizational interaction map may be used to infer useful relations. For example, employee emotion information can be tracked across multiple meetings over time, and/or evaluated in relation to specific interactions and topics. The same applies to speaker role and engagement. The interaction maps may be viewed as behavioral and/or sociometric reports associated with one or more employees. The interaction maps may be stored for later evaluation. For example, the interaction maps may be made accessible to managers and employees for improvement/self-improvement purposes. For example, studying the interaction maps may clearly point out lack of collaboration/communication between teams, between individuals, and/or the like.

In at least one example embodiment, HR correlation module 305 correlates an organizational interaction map with workforce information. In at least one example embodiment, workforce information relates to human resource information. For example, human resource information may comprise information indicative of employee classification, employee performance information, employee hiring information, or employee termination information, and/or the like. For example, the HR correlation module may correlate a surge in non-manager meeting participants taking on leadership roles in meetings with a subsequent period of high employee turnover.

Figure 4:
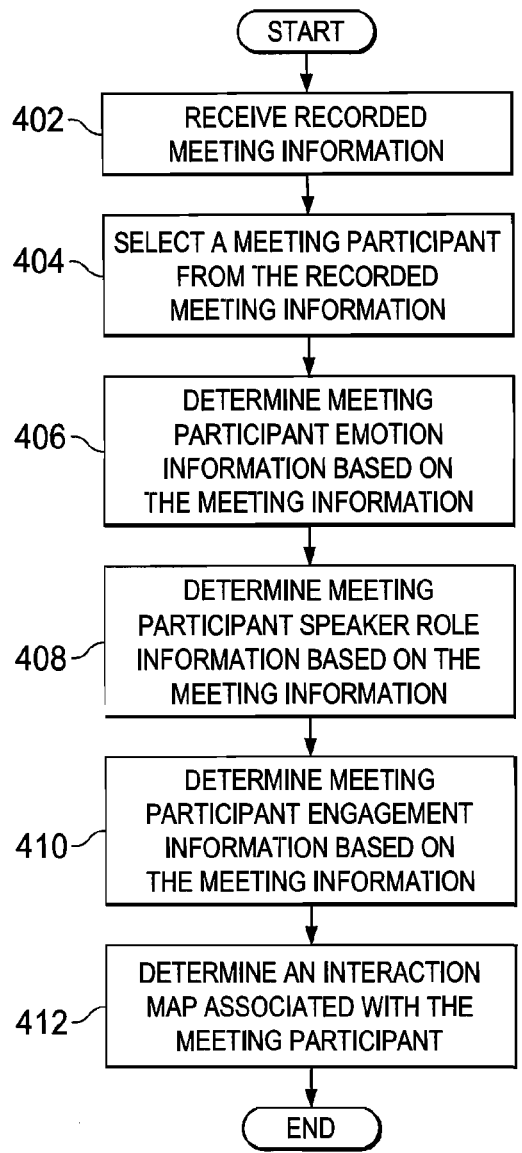
FIG. 4 is a flow diagram illustrating activities associated with an interaction map according to at least one example embodiment.

FIG. 4 is a flow diagram illustrating activities associated with an interaction map according to at least one example embodiment. In at least one example embodiment, there is a set of operations that corresponds to the activities of FIG. 4. An apparatus, for example MCS/MCC 44 of FIG. 1 and FIG. 2, or a portion thereof, may utilize the set of operations. The apparatus may comprise means, including, for example processor 84*f* of FIG. 2, for performing such operations. In an example embodiment, an apparatus, for example MCS/MCC 44 of FIG. 1 and FIG. 2, is transformed by having memory, for example memory element 86*f* of FIG. 2, comprising computer code configured to, working with a processor, for example processor 84*f* of FIG. 2, cause the apparatus to perform set of operations of FIG. 4.

Even though the example of FIG. 4 includes blocks 406, 408, and 410, one or more of block 406, 408, and 410 may be omitted. For example, the apparatus may perform at least one of block 406, 408, or 410.

At block 402, the apparatus receives recorded meeting information. The receipt and the recorded meeting information may be similar as described regarding FIG. 3.

At block 404, the apparatus selects a meeting participant from the recorded meeting information. The selection of the meeting participant information may be based, at least in part, on designation, such as a user designation, by systematic selection, such as part of an evaluation of multiple meeting participants, and/or the like.

At block 406, the apparatus determines meeting participant emotion information based, at least in part, on the meeting information. The determination and the emotion information may be similar as described regarding FIG. 3, FIG. 7, and/or the like.

At block 408, the apparatus determines meeting participant speaker role information based, at least in part, on the meeting information. The determination and the speaker role information may be similar as described regarding FIG. 3, FIG. 8, and/or the like.

At block 410, the apparatus determines meeting participant engagement information based, at least in part, on the meeting information. The determination and the engagement information may be similar as described regarding FIG. 3, FIG. 9, and/or the like.

At block 412, the apparatus determines an interaction map associated with the meeting participant based, at least in part, on at least one of the meeting participant emotion information, the meeting participant speaker role information, or the meeting participant engagement information. The determination and the interaction map may be similar as described regarding FIG. 3.

Figure 5:
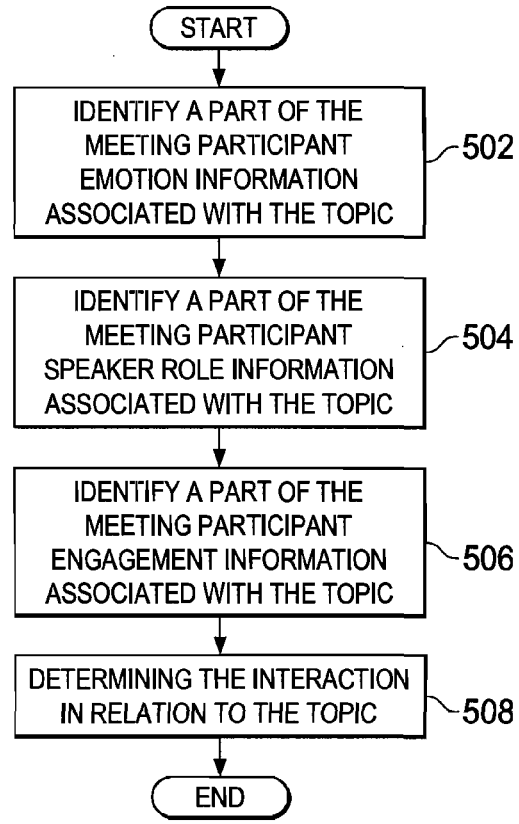
FIG. 5 is a flow diagram illustrating activities associated with interaction information in relation to a topic according to at least one example embodiment.

FIG. 5 is a flow diagram illustrating activities associated with interaction information in relation to a topic according to at least one example embodiment. In at least one example embodiment, there is a set of operations that corresponds to the activities of FIG. 5. An apparatus, for example MCS/MCC 44 of FIG. 1 and FIG. 2, or a portion thereof, may utilize the set of operations. The apparatus may comprise means, including, for example processor 84*f* of FIG. 2, for performing such operations. In an example embodiment, an apparatus, for example MCS/MCC 44 of FIG. 1 and FIG. 2, is transformed by having memory, for example memory element 86*f* of FIG. 2, comprising computer code configured to, working with a processor, for example processor 84*f* of FIG. 2, cause the apparatus to perform set of operations of FIG. 5.

Even though the example of FIG. 5 includes blocks 502, 504, and 506, one or more of block 502, 504, and 506 may be omitted. For example, the apparatus may perform at least one of block 502, 504, and 506.

In at least one example embodiment, interaction information in relation to the topic relates to meeting participant emotion information in relation to the topic, meeting participant speaker role information in relation to the topic, meeting participant engagement information in relation to the topic, and/or the like. For example, the apparatus may correlate to one or more parts of the interaction map with a topic such that the parts of the interaction map are indicative of interaction in relation to the topic. The apparatus may identify the topic by way of topic information. The topic information may be provided by way of topic identification, such as by topic identification module 336 of FIG. 6.

At block 502, the apparatus identifies a part of the meeting participant emotion information associated with the topic. The apparatus may identify the part of the emotion information associated with the topic by way of correlating a time associated with discussion of the topic with a time associated with the emotion information.

At block 504, the apparatus identifies a part of the meeting participant speaker role information associated with the topic. The apparatus may identify the part of the speaker role information associated with the topic by way of correlating a time associated with discussion of the topic with a time associated with the speaker role information.

At block 506, the apparatus identifies a part of the meeting participant engagement information associated with the topic. The apparatus may identify the part of the engagement information associated with the topic by way of correlating a time associated with discussion of the topic with a time associated with the engagement information.

At block 508, the apparatus determines the interaction information in relation to the topic based, at least in part, on at least one of the identified part of the meeting participant emotion information, the identified part of the meeting participant speaker role information, and the identified part of the meeting participant engagement information.

Figure 6:
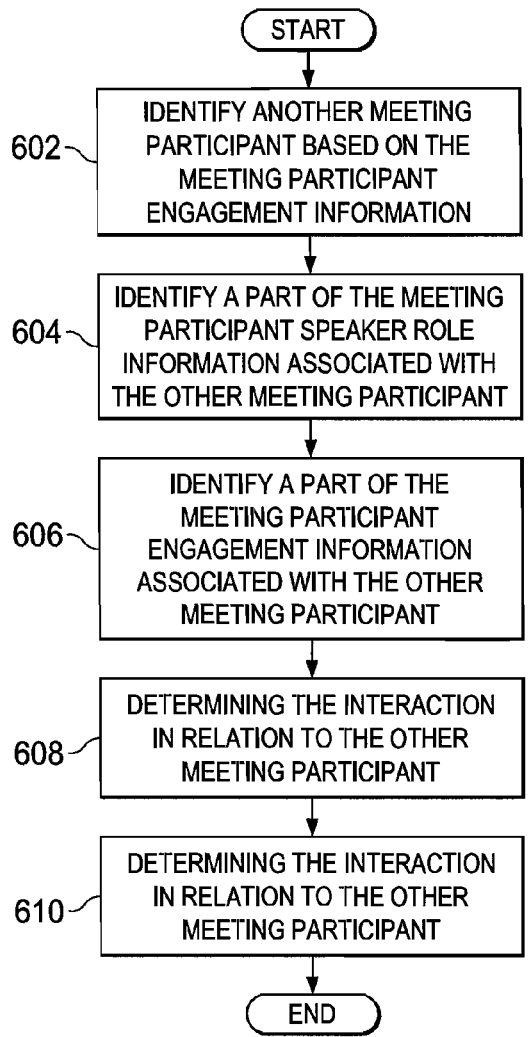
FIG. 6 is a flow diagram illustrating activities associated with interaction information in relation to another meeting participant according to at least one example embodiment.

FIG. 6 is a flow diagram illustrating activities associated with interaction information in relation to another meeting participant according to at least one example embodiment. In at least one example embodiment, there is a set of operations that corresponds to the activities of FIG. 6. An apparatus, for example MCS/MCC 44 of FIG. 1 and FIG. 2, or a portion thereof, may utilize the set of operations. The apparatus may comprise means, including, for example processor 84*f* of FIG. 2, for performing such operations. In an example embodiment, an apparatus, for example MCS/MCC 44 of FIG. 1 and FIG. 2, is transformed by having memory, for example memory element 86*f* of FIG. 2, comprising computer code configured to, working with a processor, for example processor 84*f* of FIG. 2, cause the apparatus to perform set of operations of FIG. 6.

Even though the example of FIG. 6 includes blocks 604, 605, and 606, one or more of block 604, 605, and 606 may be omitted. For example, the apparatus may perform at least one of block 604, 605, and 606.

In at least one example embodiment, interaction information in relation to the other meeting participant relates to meeting participant emotion information in relation to the other meeting participant, meeting participant speaker role information in relation to the other meeting participant, meeting participant engagement information in relation to the other meeting participant, and/or the like. For example, the apparatus may correlate to one or more parts of the interaction map with another meeting participant such that the parts of the interaction map are indicative of interaction with the other meeting participant.

At block 602, the apparatus identifies another meeting participant. In some circumstances the identification of the other meeting participant may be based, at least in part, on the meeting participant engagement information. For example, the other meeting participant may be a person to whom the meeting participant is speaking.

At block 604, the apparatus identifies a part of the meeting participant emotion information associated with the other meeting participant. The apparatus may identify the part of the emotion information associated with the other meeting participant by way of correlating a time associated with discussion with the other meeting participant with a time associated with the emotion information.

At block 606, the apparatus identifies a part of the meeting participant speaker role information associated with the other meeting participant. The apparatus may identify the part of the speaker role information associated with the other meeting participant by way of correlating a time associated with discussion with the other meeting participant with a time associated with the speaker role information.

At block 608, the apparatus identifies a part of the meeting participant engagement information associated with the other meeting participant. The apparatus may identify the part of the engagement information associated with the other meeting participant by way of correlating a time associated with discussion with the other meeting participant with a time associated with the engagement information.

At block 610, the apparatus determines the interaction information in relation to the other meeting participant based, at least in part, on at least one of the identified part of the meeting participant emotion information, the identified part of the meeting participant speaker role information, or the identified part of the meeting participant engagement information.

FIG. 7 is a flow diagram illustrating activities associated with determination of meeting participant emotion information according to at least one example embodiment. In at least one example embodiment, there is a set of operations that corresponds to the activities of FIG. 7. An apparatus, for example MCS/MCC 44 of FIG. 1 and FIG. 2, or a portion thereof, may utilize the set of operations. The apparatus may comprise means, including, for example processor 84*f* of FIG. 2, for performing such operations. In an example embodiment, an apparatus, for example MCS/MCC 44 of FIG. 1 and FIG. 2, is transformed by having memory, for example memory element 86*f* of FIG. 2, comprising computer code configured to, working with a processor, for example processor 84*f* of FIG. 2, cause the apparatus to perform set of operations of FIG. 7.

At block 702, the apparatus identifies a part of the recorded meeting information associated with the meeting participant. The identification may be based, at least in part, on engagement information, selection of the meeting participant, and/or the like.

At block 704, the apparatus performs emotion recognition. In at least one example embodiment, the emotion recognition is based, at least in part, on facial expression of the meeting participant, word utilization by the meeting participant, pitch of speech by the meeting participant, posture of the meeting participant, a gesture performed by the meeting participant, to determine an emotional state of the meeting participant, and/or the like. For example, the apparatus may evaluate such information against a predetermined set of information that is indicative of emotion information. In this manner, the apparatus may determine similarity between the determined information and the predetermined set of information to determine emotional information associated with the meeting participant.

At block 706, the apparatus correlates the emotional state with a time associated with the recorded meeting information.

Figure 8:
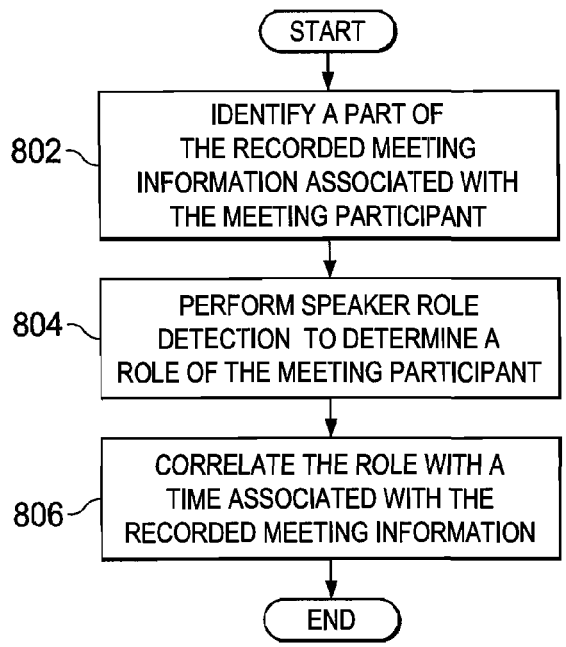
FIG. 8 is a flow diagram illustrating activities associated with determination of meeting participant speaker role information according to at least one example embodiment.

FIG. 8 is a flow diagram illustrating activities associated with determination of meeting participant speaker role information according to at least one example embodiment. In at least one example embodiment, there is a set of operations that corresponds to the activities of FIG. 8. An apparatus, for example MCS/MCC 44 of FIG. 1 and FIG. 2, or a portion thereof, may utilize the set of operations. The apparatus may comprise means, including, for example processor 84*f* of FIG. 2, for performing such operations. In an example embodiment, an apparatus, for example MCS/MCC 44 of FIG. 1 and FIG. 2, is transformed by having memory, for example memory element 86*f* of FIG. 2, comprising computer code configured to, working with a processor, for example processor 84*f* of FIG. 2, cause the apparatus to perform set of operations of FIG. 8.

At block 802, the apparatus identifies a part of the recorded meeting information associated with the meeting participant, similar as described regarding block 702 of FIG. 7.

At block 804, the apparatus performs speaker role detection. In at least one example embodiment, the speaker role detection is based, at least in part, on word utilization by the meeting participant, vocal interaction patterns associated with the meeting participant, to determine a role of the meeting participant, and/or the like. For example, the apparatus may evaluate such information against a predetermined set of information that is indicative of a speaker role. In this manner, the apparatus may determine similarity between the determined information and the predetermined set of information to determine the speaker role information associated with the meeting participant.

At block 806, the apparatus correlates the role with a time associated with the recorded meeting information.

Figure 9:
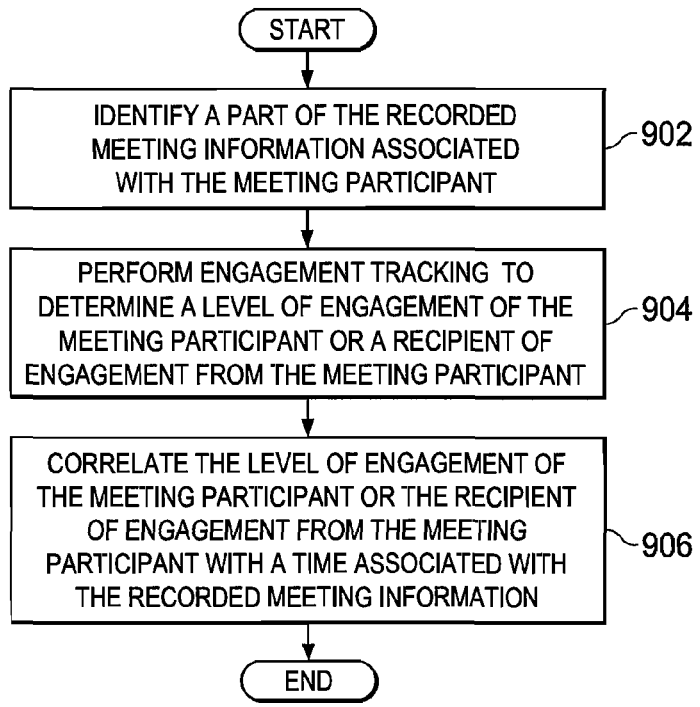
FIG. 9 is a flow diagram illustrating activities associated with determination of meeting participant engagement information according to at least one example embodiment.

FIG. 9 is a flow diagram illustrating activities associated with determination of meeting participant engagement information according to at least one example embodiment. In at least one example embodiment, there is a set of operations that corresponds to the activities of FIG. 9. An apparatus, for example MCS/MCC 44 of FIG. 1 and FIG. 2, or a portion thereof, may utilize the set of operations. The apparatus may comprise means, including, for example processor 84*f* of FIG. 2, for performing such operations. In an example embodiment, an apparatus, for example MCS/MCC 44 of FIG. 1 and FIG. 2, is transformed by having memory, for example memory element 86*f* of FIG. 2, comprising computer code configured to, working with a processor, for example processor 84*f* of FIG. 2, cause the apparatus to perform set of operations of FIG. 9.

At block 902, the apparatus identifies a part of the recorded meeting information associated with the meeting participant, similar as described regarding block 702 of FIG. 7.

At block 904, the apparatus performs engagement tracking. In at least one example embodiment, the engagement tracking is based, at least in part, on word utilization by the meeting participant, gaze tracking of the meeting participant, and/or the like. In at least one example embodiment, the engagement tracking determines engagement information, such as a level of engagement of the meeting participant, a recipient of engagement from the meeting participant, and/or the like. For example, the apparatus may evaluate such information against a predetermined set of information that is indicative of engagement information. In this manner, the apparatus may determine similarity between the determined information and the predetermined set of information to determine engagement information associated with the meeting participant.

At block 906, the apparatus correlates at least one of the level of engagement of the meeting participant or the recipient of engagement from the meeting participant with a time associated with the recorded meeting information.

FIG. 10 is a flow diagram illustrating activities associated with a meeting interaction map according to at least one example embodiment. In at least one example embodiment, there is a set of operations that corresponds to the activities of FIG. 10. An apparatus, for example MCS/MCC 44 of FIG. 1 and FIG. 2, or a portion thereof, may utilize the set of operations. The apparatus may comprise means, including, for example processor 84*f* of FIG. 2, for performing such operations. In an example embodiment, an apparatus, for example MCS/MCC 44 of FIG. 1 and FIG. 2, is transformed by having memory, for example memory element 86*f* of FIG. 2, comprising computer code configured to, working with a processor, for example processor 84*f* of FIG. 2, cause the apparatus to perform set of operations of FIG. 10.

Even though the example of FIG. 10 includes blocks 1006, 1008, and 1010, one or more of block 1006, 1008, and 1010 may be omitted. For example, the apparatus may perform at least one of block 1006, 1008, or 1010.

As previously described, it may be desirable to determine a meeting interaction map. In such circumstances, the apparatus may determine an interaction map associated with each meeting participant, and generate the meeting interaction map by correlating the meeting participant interaction maps with each other.

At block 1002, the apparatus receives recorded meeting information, similarly as described regarding block 402 of FIG. 4. At block 1004, the apparatus selects a meeting participant from the recorded meeting information, similarly as described regarding block 404 of FIG. 4. At block 1006, the apparatus determines meeting participant emotion information based, at least in part, on the meeting information, similarly as described regarding block 406 of FIG. 4. At block 1008, the apparatus determines meeting participant speaker role information based, at least in part, on the meeting information, similarly as described regarding block 408 of FIG. 4. At block 1010, the apparatus determines meeting participant engagement information based, at least in part, on the meeting information, similarly as described regarding block 410 of FIG. 4. At block 1012, the apparatus determines an interaction map associated with the meeting participant based, at least in part, on at least one of the meeting participant emotion information, the meeting participant speaker role information, or the meeting participant engagement information, similarly as described regarding block 412 of FIG. 4.

At block 1014, the apparatus determines whether there is another meeting participant that has not been selected, for example selected at block 1004. If the apparatus determines that there are more meeting participants to be selected, flow returns to block 1004. If the apparatus determines that there are no more meeting participants to be selected, flow proceeds to block 1016.

At block 1016, the apparatus correlates each meeting participant interaction map with each other meeting participant interaction map to generate a meeting interaction map. In this manner, the meeting interaction map may be indicative of each meeting participant interaction map associated with the meeting session.

Figure 11:
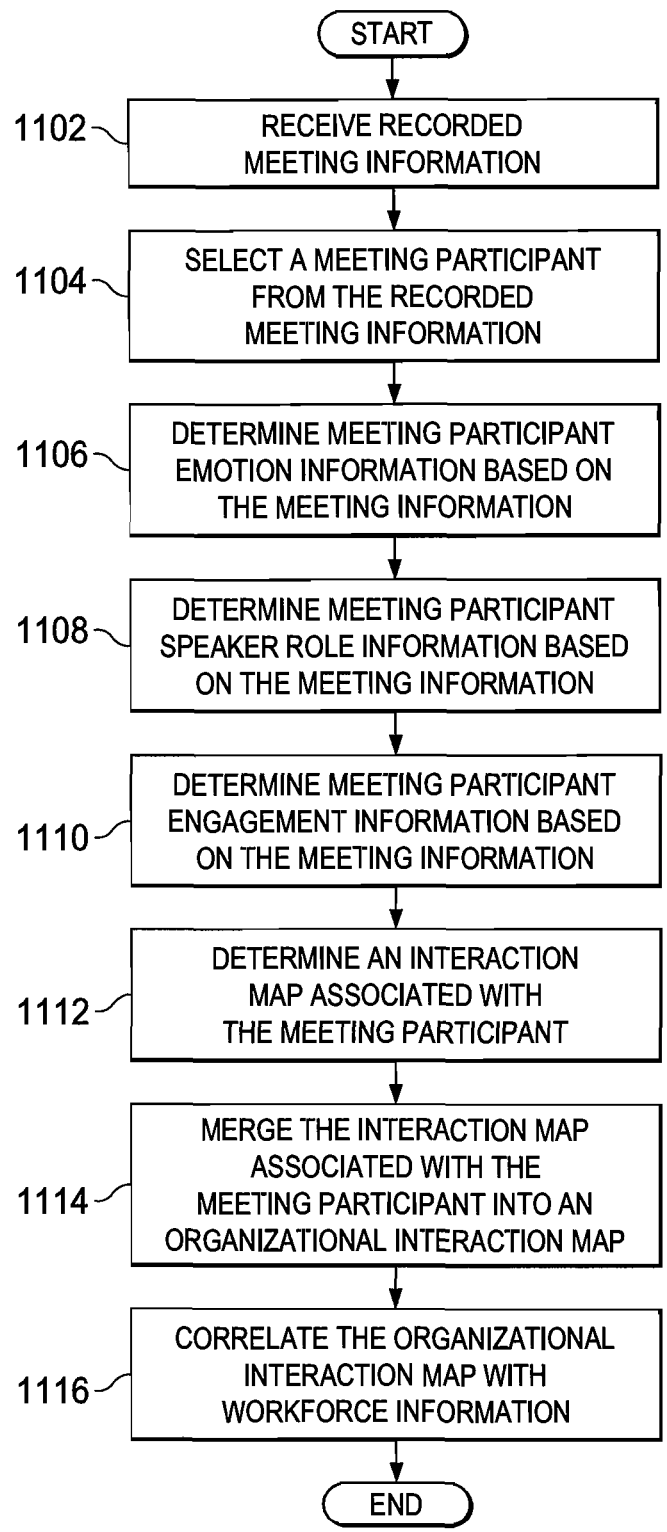
FIG. 11 is a flow diagram illustrating activities associated with an organizational interaction map according to at least one example embodiment.

FIG. 11 is a flow diagram illustrating activities associated with an organizational interaction map according to at least one example embodiment. In at least one example embodiment, there is a set of operations that corresponds to the activities of FIG. 11. An apparatus, for example MCS/MCC 44 of FIG. 1 and FIG. 2, or a portion thereof, may utilize the set of operations. The apparatus may comprise means, including, for example processor 84*f* of FIG. 2, for performing such operations. In an example embodiment, an apparatus, for example MCS/MCC 44 of FIG. 1 and FIG. 2, is transformed by having memory, for example memory element 86*f* of FIG. 2, comprising computer code configured to, working with a processor, for example processor 84*f* of FIG. 2, cause the apparatus to perform set of operations of FIG. 11.

Even though the example of FIG. 11 includes blocks 1106, 1108, and 1110, one or more of block 1106, 1108, and 1110 may be omitted. For example, the apparatus may perform at least one of block 1106, 1108, or 1110.

At block 1102, the apparatus receives recorded meeting information, similarly as described regarding block 402 of FIG. 4. At block 1104, the apparatus selects a meeting participant from the recorded meeting information, similarly as described regarding block 404 of FIG. 4. At block 1106, the apparatus determines meeting participant emotion information based, at least in part, on the meeting information, similarly as described regarding block 406 of FIG. 4. At block 1108, the apparatus determines meeting participant speaker role information based, at least in part, on the meeting information, similarly as described regarding block 408 of FIG. 4. At block 1110, the apparatus determines meeting participant engagement information based, at least in part, on the meeting information, similarly as described regarding block 410 of FIG. 4. At block 1112, the apparatus determines an interaction map associated with the meeting participant based, at least in part, on at least one of the meeting participant emotion information, the meeting participant speaker role information, or the meeting participant engagement information, similarly as described regarding block 412 of FIG. 4.

At block 1114, the apparatus merges the interaction map associated with the meeting participant into an organizational interaction map that comprises information indicative of a plurality of interaction maps associated with a plurality of meeting participants. The merging may comprise retrieving an existing organization interaction map, for example from an HR repository, and merging the interaction map associated with the meeting participant into the retrieved organizational interaction map.

At block 1116, the apparatus correlates the organizational interaction map with workforce information. The correlation may be similar as described regarding FIG. 3. In some circumstances apparatus may store information indicative of the correlation, for example in an HR repository.

Note that with the examples provided herein, interaction may be described in terms of two or three elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and may accommodate a large number of rooms and sites, as well as more complicated/sophisticated arrangements and configurations. Accordingly, the examples provided herein should not limit the scope or inhibit the broad teachings of communication system 10 as potentially applied to a myriad of other architectures. Additionally, although described with reference to particular scenarios where MCSs/MCC 44 resides in a particular physical location, MCSs/MCC 44 may reside in any location, provided it has some connectivity to a suitable network.

It is also important to note that the steps discussed with reference to FIGS. 1-9 illustrate only some of the possible scenarios that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Although the present disclosure has been described in detail with reference to particular embodiments, it should be understood that various other changes, substitutions, and alterations may be made hereto without departing from the spirit and scope of the present disclosure. For example, although the present disclosure has been described as operating in WebEx and Meeting Place conferencing environments or arrangements, the present disclosure may be used in any online environment that could benefit from such technology. For example, in certain instances, computers that are coupled to each other in some fashion may utilize the teachings of the present disclosure (e.g., even though participants would be in a face-to-face arrangement). Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A method comprising:
receiving, by a multimedia conference server, recorded meeting information, the recorded meeting information comprising audio data, video data, and a list of meeting participants, and the recorded meeting information corresponding to a meeting that has ended;
executing, by the multimedia conference server, a video feature extraction algorithm to generate scale-invariant feature transform (SIFT) data based on the video data;
executing, by the multimedia conference server, an audio feature extraction algorithm to generate mel-frequency cepstrum (MFC) data based on the audio data;
selecting, by the multimedia conference server, a meeting participant from the list of meeting participants;
generating, by the multimedia conference server, at least one label identifying the meeting participant in a segment of the recorded meeting information, wherein the generating comprises:
generating the at least one label when it is determined, based on the SIFT data, that a face of the meeting participant is present in the video data, and
generating the at least one label when it is determined, based on the MFC data, that a voice print of the meeting participant is present in the audio data;
determining, by the multimedia conference server, at least one of meeting participant emotion information, meeting participant speaker role information, or meeting participant engagement information based, at least in part, on the SIFT data and the MFC data;
generating, by the multimedia conference server, an interaction map associated with the meeting participant based, at least in part, on at least one of the meeting participant emotion information, the meeting participant speaker role information, or the meeting participant engagement information;
merging the interaction map into an organizational interaction map that comprises information indicative of a plurality of interaction maps, wherein the organizational interaction map corresponds to an organization;
generating a behavioral report for the meeting participant from the organizational interaction map, wherein the meeting participant is an employee of the organization and the behavioral report includes sociometric data for the meeting participant over a plurality of past meetings; and
transmitting the behavioral report to an endpoint associated with a manager within the organization.

2. The method of claim 1, wherein the interaction map associated with the meeting participant comprises at least one of interaction information in relation to a topic, interaction information in relation to another meeting participant from the list of meeting participants, or interaction quality information.

3. The method of claim 1, wherein the meeting participant emotion information relates to information indicative of an emotional state of the meeting participant in relation to, at least part of, the recorded meeting information.

4. The method of claim 1, further comprising:
determining, for each meeting participant of the list of meeting participants, at least one of meeting participant emotion information, meeting participant speaker role information, or meeting participant engagement information based, at least in part, on the SIFT data and the MFC data; and generating, for each meeting participant, an interaction map associated with the meeting participant based, at least in part, on at least one of the meeting participant emotion information, the meeting participant speaker role information, or the meeting participant engagement information.

5. The method of claim 4, further comprising correlating each meeting participant interaction map with each other meeting participant interaction map to generate a meeting interaction map.

6. The method of claim 5, further comprising:
merging the meeting interaction map into the organizational interaction map, wherein the organizational interaction map further comprises information indicative of a plurality of meeting interaction maps.

7. The method of claim 1, wherein each of the plurality of interaction maps is associated with one of a plurality of meeting participants.

8. The method of claim 7, further comprising correlating the organizational interaction map with workforce information.

9. A server comprising at least one processor and at least one memory, the at least one memory including computer program instructions that, when executed by the at least one processor, cause the server to:
receive recorded meeting information, the recorded meeting information comprising audio data, video data, and a list of meeting participants, and the recorded meeting information corresponding to a meeting that has ended;
execute a video feature extraction algorithm to generate scale-invariant feature transform (SIFT) data based on the video data;
execute an audio feature extraction algorithm to generate mel-frequency cepstrum (MFC) data based on the audio data;
select a meeting participant from the list of meeting participants;
generate at least one label identifying the meeting participant in a segment of the recorded meeting information, wherein the generating comprises that the computer program instructions, when executed, cause the server to:
generate the at least one label when it is determined, based on the SIFT data, that a face of the meeting participant is present in the video data, and
generate the at least one label when it is determined, based on the MFC data, that a voice print of the meeting participant is present in the audio data;
determine at least one of meeting participant emotion information, meeting participant speaker role information, or meeting participant engagement information based, at least in part, on the SIFT data and the MFC data;
generate an interaction map associated with the meeting participant based, at least in part, on at least one of the meeting participant emotion information, the meeting participant speaker role information, or the meeting participant engagement information;
merge the interaction map into an organizational interaction map that comprises information indicative of a plurality of interaction maps, wherein the organizational interaction map corresponds to an organization;
generate a behavioral report for the meeting participant from the organizational interaction map, wherein the meeting participant is an employee of the organization and the behavioral report includes sociometric data for the meeting participant over a plurality of past meetings; and
transmit the behavioral report to an endpoint associated with a manager within the organization.

10. The server of claim 9, wherein the interaction map associated with the meeting participant comprises at least one of interaction information in relation to a topic, interaction information in relation to another meeting participant, interaction quality information.

11. The server of claim 9, wherein the meeting participant emotion information relates to information indicative of an emotional state of the meeting participant in relation to, at least part of, the recorded meeting information.

12. The server of claim 9, wherein the memory further includes computer program instructions that, when executed by the at least one processor, cause the server to perform:
determination, for each meeting participant, of at least one of meeting participant emotion information, meeting participant speaker role information, or meeting participant engagement information based, at least in part, on the SIFT data and the MFC data; and
generation, for each meeting participant, of an interaction map associated with the meeting participant based, at least in part, on at least one of the meeting participant emotion information, the meeting participant speaker role information, or the meeting participant engagement information.

13. The server of claim 12, wherein the memory further includes computer program instructions that, when executed by the at least one processor, cause the server to perform correlation of each meeting participant interaction map with each other meeting participant interaction map to generate a meeting interaction map.

14. The server of claim 13, wherein the memory further includes computer program instructions that, when executed by the at least one processor, cause the server to:
merge the meeting interaction map into the organizational interaction map, wherein the organizational interaction map further comprises information indicative of a plurality of meeting interaction maps.

15. The server of claim 9, wherein each of the plurality of interaction maps is associated with one of a plurality of meeting participants.

16. The server of claim 15, wherein the memory further includes computer program instructions that, when executed by the at least one processor, cause the server to perform correlation of the organizational interaction map with workforce information.

17. The server of claim 16, wherein workforce information comprises information indicative of at least one of employee classification, employee performance information, employee hiring information, or employee termination information.

18. At least one non-transitory computer readable medium comprising instructions that, when executed, cause an apparatus to:
receive recorded meeting information, the recorded meeting information comprising audio data, video data, and a list of meeting participants, and the recorded meeting information corresponding to a meeting that has ended;
execute a video feature extraction algorithm to generate scale-invariant feature transform (SIFT) data based on the video data;
execute an audio feature extraction algorithm to generate mel-frequency cepstrum (MFC) data based on the audio data;
select a meeting participant from the list of meeting participants;
generate at least one label identifying the meeting participant in a segment of the meeting information, wherein the generating comprises that the instructions, when executed, cause the apparatus to:
  generate the at least one label when it is determined, based on the SIFT data, that a face of the meeting participant is present in the video data, and
  generate the at least one label when it is determined, based on the MFC data, that a voice print of the meeting participant is present in the audio data;
determine at least one of meeting participant emotion information, meeting participant speaker role information, or meeting participant engagement information based, at least in part, on the SIFT data and the MFC data;
generate an interaction map associated with the meeting participant based, at least in part, on at least one of the meeting participant emotion information, the meeting participant speaker role information, or the meeting participant engagement information;
merge the interaction map into an organizational interaction map that comprises information indicative of a plurality of interaction maps, wherein the organizational interaction map corresponds to an organization;
generate a behavioral report for the meeting participant from the organizational interaction map, wherein the meeting participant is an employee of the organization and the behavioral report includes sociometric data for the meeting participant over a plurality of past meetings; and
transmit the behavioral report to an endpoint associated with a manager within the organization.

19. The medium of claim 18, wherein the interaction map associated with the meeting participant comprises at least one of interaction information in relation to a topic, interaction information in relation to another meeting participant, interaction quality information.

20. The at least one non-transitory computer readable medium of claim 18, wherein the meeting participant emotion information relates to information indicative of an emotional state of the meeting participant in relation to, at least part of, the recorded meeting information.

21. The at least one non-transitory computer readable medium of claim 18, wherein the instructions further cause the apparatus to perform:
  determination, for each meeting participant, of at least one of meeting participant emotion information, meeting participant speaker role information, or meeting participant engagement information based, at least in part, on the SIFT data and the MFC data; and
  determination, for each meeting participant, of an interaction map associated with the meeting participant based, at least in part, on at least one of the meeting participant emotion information, the meeting participant speaker role information, or the meeting participant engagement information.

22. The at least one non-transitory computer readable medium of claim 21, wherein the instructions further cause the apparatus to perform correlation of each meeting participant interaction map with each other meeting participant interaction map to generate a meeting interaction map.

23. The at least one non-transitory computer readable medium of claim 22, wherein the instructions further cause the apparatus to:
  merge the meeting interaction map into the organizational interaction map, wherein the organizational interaction map further comprises information indicative of a plurality of meeting interaction maps.

24. The at least one non-transitory computer readable medium of claim 18, wherein each of the plurality of interaction maps is associated with one of a plurality of meeting participants.

25. The at least one non-transitory computer readable medium of claim 24, wherein the instructions further cause the apparatus to perform correlation of the organizational interaction map with workforce information.

* * * * *